United States Patent
Andersen

(10) Patent No.: US 11,172,259 B2
(45) Date of Patent: Nov. 9, 2021

(54) VIDEO SURVEILLANCE METHOD AND SYSTEM

(71) Applicant: CANON KABUSHIKI KAISHA, Tokyo (JP)

(72) Inventor: Bo Andersen, Søborg (DK)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/210,837

(22) Filed: Dec. 5, 2018

(65) Prior Publication Data

US 2019/0191123 A1    Jun. 20, 2019

(30) Foreign Application Priority Data

Dec. 20, 2017  (GB) .................................. 1721425

(51) Int. Cl.
*H04N 5/445* (2011.01)
*H04N 7/18* (2006.01)
*H04N 21/47* (2011.01)
*G08B 13/196* (2006.01)
*H04N 21/431* (2011.01)

(52) U.S. Cl.
CPC ........... *H04N 21/47* (2013.01); *G08B 13/196* (2013.01); *H04N 7/181* (2013.01); *H04N 21/4316* (2013.01)

(58) Field of Classification Search
CPC ..... H04N 2005/44595; H04N 5/44591; H04N 7/181
See application file for complete search history.

(56) References Cited

U.S. PATENT DOCUMENTS

| 5,956,081 A * | 9/1999 | Katz ..................... H04N 7/181 348/163 |
| 6,031,573 A * | 2/2000 | MacCormack .. G08B 13/19604 375/240.16 |
| 2003/0197785 A1* | 10/2003 | White ................ H04N 21/4314 348/207.99 |
| 2004/0263625 A1* | 12/2004 | Ishigami ................ H04N 7/181 348/152 |

(Continued)

FOREIGN PATENT DOCUMENTS

| EP | 3272586 A1 | 1/2018 |
| EP | 3413570 A1 | 12/2018 |
| JP | 2017139725 A | 8/2017 |

OTHER PUBLICATIONS

"Automatic camera selection for activity monitoring in a multi-camera system for tennis"—Philip Kelly; Ciaran O Conaire; Chanyul Kim; Noel E. O'Connor; 2009 Third ACM/IEEE International Conference on Distributed Smart Cameras (ICDSC); Aug. 30-Sep. 2, 2009 (Year: 2009).*

(Continued)

*Primary Examiner* — Mainul Hasan
(74) *Attorney, Agent, or Firm* — Canon U.S.A., Inc. IP Division

(57) ABSTRACT

A video surveillance method comprises displaying a first stream of video data from a first video camera on a display of an operator client. On receipt of a command, prestored alternative camera data is consulted to select a second video camera. A second stream of video data from the second video camera is then displayed on the display. The first and second video cameras have fields of view which overlap.

19 Claims, 4 Drawing Sheets

(56) References Cited

U.S. PATENT DOCUMENTS

| | | | |
|---|---|---|---|
| 2006/0098100 A1* | 5/2006 | Hinkel | H04N 7/183 348/211.13 |
| 2007/0217765 A1* | 9/2007 | Itoh | H04N 5/76 386/202 |
| 2008/0198231 A1* | 8/2008 | Ozdemir | G08B 25/009 348/159 |
| 2009/0009605 A1* | 1/2009 | Ortiz | H04L 69/329 348/157 |
| 2010/0214417 A1* | 8/2010 | Gennari | G08B 13/19645 348/159 |
| 2011/0242317 A1* | 10/2011 | Wengrovitz | H04N 21/26258 348/143 |
| 2011/0267471 A1* | 11/2011 | Lee | H04N 7/181 348/159 |
| 2012/0169882 A1 | 7/2012 | Millar et al. | |
| 2013/0129304 A1* | 5/2013 | Feinson | H04N 21/4331 386/223 |
| 2014/0211019 A1* | 7/2014 | Choi | H04N 7/181 348/159 |
| 2015/0103178 A1* | 4/2015 | Itoh | G06K 9/00771 348/159 |
| 2016/0092056 A1 | 3/2016 | Yang et al. | |
| 2017/0297489 A1 | 10/2017 | Fendt | |
| 2018/0343442 A1* | 11/2018 | Yoshikawa | G08B 13/19641 |

OTHER PUBLICATIONS

Combined Search and Examination Report under Sections 17 and 18(3) for Application No. GB 1721425.5, dated Apr. 17, 2018.

* cited by examiner

VIDEO SURVEILLANCE METHOD AND SYSTEM

CROSS-REFERENCE TO RELATED APPLICATIONS

This application claims the benefit under 35 U.S.C. § 119(a)-(d) of United Kingdom Patent Application No. 1721425.5, filed on Dec. 20, 2017 and titled "VIDEO SURVEILLANCE METHOD AND SYSTEM". The above cited patent application is incorporated herein by reference in its entirety.

BACKGROUND OF THE INVENTION

The present invention relates to a video surveillance method and system.

A video surveillance management system typically receives video data from a plurality of surveillance cameras. The video surveillance management system may store the data in a recording server and carry out image processing or analytics, and transmit the video data to a client device which may be a mobile device or an operator console including a display where it is viewed by an operator. The video surveillance management system may also carry out control relating to the storage and deletion of the video data.

The video surveillance management system may also receive commands from the user, from the client device. The commands may include commands to the video management system which control which data is sent to the client device for display. For example, the operator can control which camera's data is sent from the video management system to the display so that the operator can select which camera to view data from.

The operator's display may display only data from one video camera at any one time. However, video data from multiple cameras can be displayed simultaneously in multiple window of an interface, with video from a selected camera displayed in a larger window than the other cameras. Accordingly, the client device can receive one stream of video data or multiple streams.

Video surveillance is often carried out in real time, with an operator monitoring events as they happen. Sometimes, a camera might malfunction or be obscured (possibly deliberately) at a crucial moment. This is particularly a problem in some highly sensitive video surveillance systems such as airport security or casino monitoring. In this case, an operator might wish to switch to viewing a video image from a different camera, preferably one which also shows the scene being monitored, but from a different angle. In current systems, in such a situation the operator must know which camera to switch to, or switch through viewing data from multiple cameras to find a camera viewing the same scene.

BRIEF SUMMARY OF THE INVENTION

According to a first aspect of the present invention there is provided a video surveillance method comprising:
 displaying a first stream of video data from a first video camera on a display of an operator client;
 receiving a command;
 on receipt of the command, consulting prestored alternative camera data to select a second video camera; and
 displaying a second stream of video data from the second video camera on the display;
 wherein the first and second video cameras have fields of view which overlap.

According to the invention, an operator can easily and quickly switch to view video from an alternative camera which has an overlapping field of view, in the event that the video being viewed becomes obscured, or the camera malfunctions.

According to a second aspect of the present invention there is provided a method of operating a video surveillance management system comprising:
 receiving a plurality of streams of video data from a plurality of video cameras;
 selecting a first one of the plurality of streams of video data from a first one of the video cameras for display to an operator on a display;
 receiving a command;
 on receipt of the command, selecting a second one of the plurality of streams of video data from a second one of the video cameras for display to the operator on the display;
 wherein the first and second video cameras have fields of view which overlap and the second video camera is determined by consulting prestored data stored in a storage medium of the video management system.

Another aspect of the invention relates to a non-transitory computer-readable medium storing a program which, when executed by a processing unit of a device in a surveillance and/or monitoring system, causes the device to perform the method defined above.

The non-transitory computer-readable medium and the device defined above may have features and advantages that are analogous to those set out in relation to the methods defined above.

Another aspect of the invention relates to a video surveillance device comprising:
 a display;
 a storage medium having alternative camera data stored therein;
 a processor configured to:
 receive a first stream of video data from a first video camera and display the first stream of video data as a selected image on the display;
 on receipt of a command, consult the alternative camera data to select a second video camera; and
 display a second stream of video data from the second video camera as the selected image on the display;
 wherein the first and second video cameras have fields of view which overlap.

Another aspect of the invention relates to a video management system comprising:
 a recording server configured to receive a plurality of video data streams from a plurality of video cameras;
 an operator client configured to receive, from the recording server, at least a first video data stream corresponding to a first video camera and display the first video data stream on a display;
 wherein the operator client is configured to, on receipt of a command, consult prestored alternative camera data to select a second video camera, wherein the first and second video cameras have fields of view which overlap and to display the second video data stream on the display.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
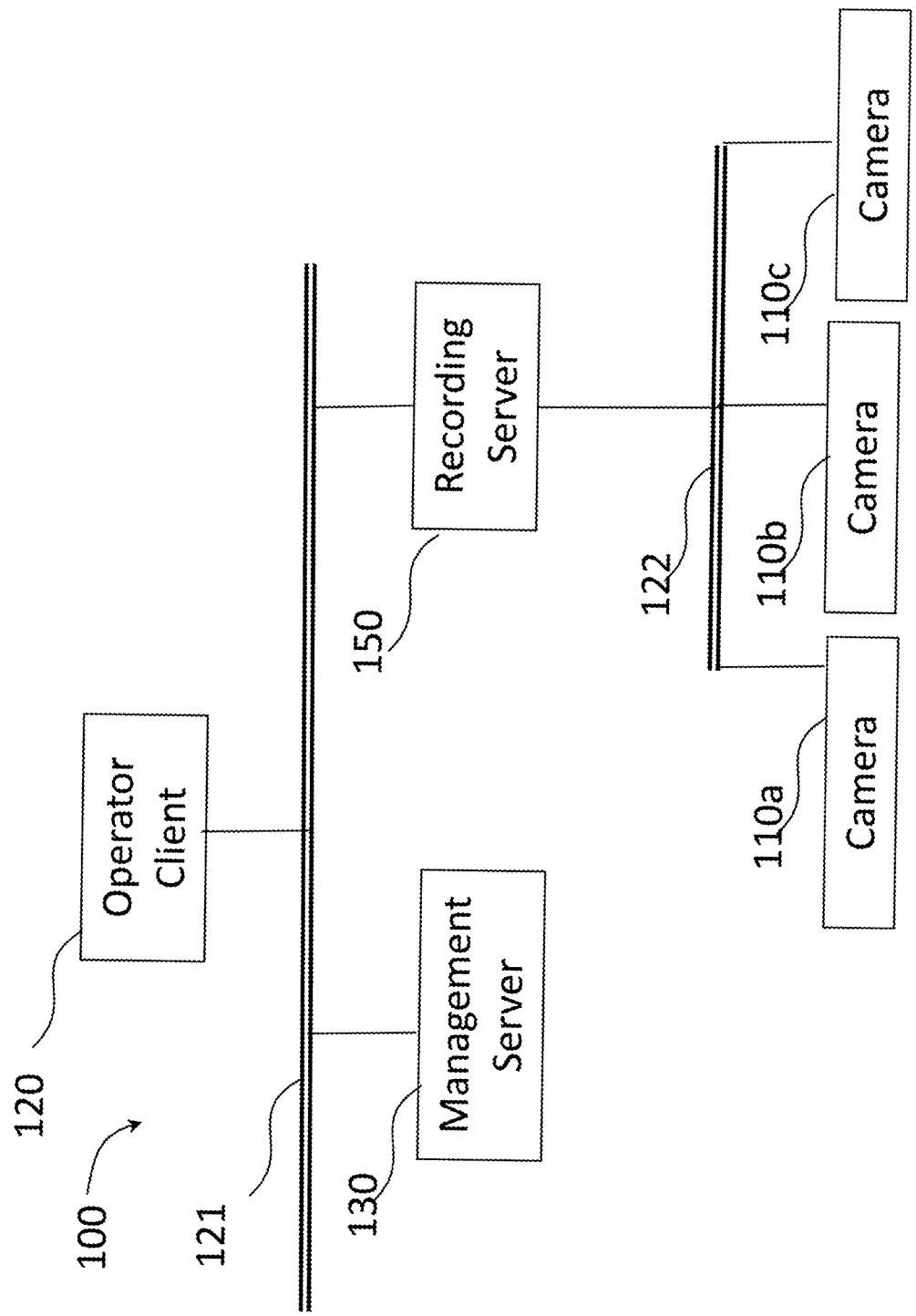
FIG. 1 illustrates an example of a video surveillance system.

FIG. 1 shows an example of a video surveillance management system 100 in which embodiments of the invention can be implemented. The system 100 comprises a management server 130 and a recording server 150. Further servers may also be included, such as further recording servers, archive servers or analytics servers. A plurality of video surveillance cameras 110a, 110b, 110c send video data to the recording server 150. An operator client 120 provides an interface via which an operator can view video data live from the cameras 110a, 110b, 110c, or recorded video data from the recording server 150.

The cameras 110a, 110b, 110c capture image data and send this to the recording server 150 as a plurality of video data streams.

The recording server 150 stores the video data streams captured by the video cameras 110a, 110b, 110c.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

The operator client 120 is provided for use by a security guard or other user in order to monitor or review the outputs of the cameras 110a, 110b, 110c. The operator client 120 may be a fixed console or could be a mobile device connected to the video management system via a network. The operator client 120 includes a display which can display an interface for interacting with the management software on the management server 130. The operator client 120 can request video data streams from one or more of the cameras 110a, 110b, 110c to view video in real time, or the operator client 120 can request recorded video data stored in the recording server 150.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. Also, a mobile server (not illustrated) may be provided to allow access to the surveillance/monitoring system from mobile devices, such as a mobile phone hosting a mobile client or a laptop accessing the system from a browser using a web client.

An analytics server can also run analytics software for image analysis, for example motion or object detection, facial recognition, event detection.

The operator client 120 is configured to communicate via a first network/bus 121 with the management server 130 and the recording server 150 and the cameras 110a, 110b, 110c. The recording server 150 communicates with the cameras 110a, 110b, 110c via a second network/bus 122.

Figure 2:
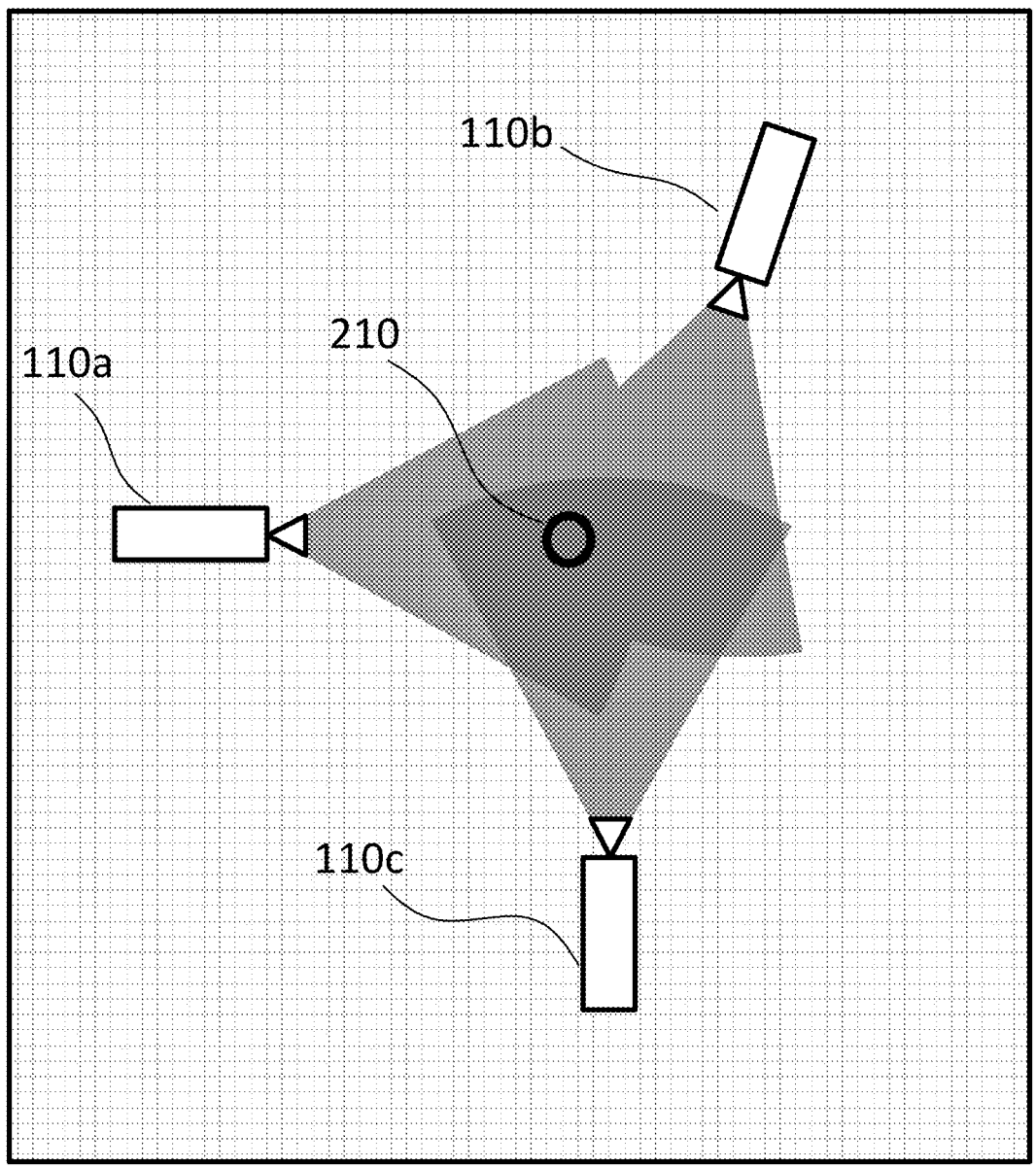
FIG. 2 is a plan view of a plurality of video surveillance cameras arranged to view a scene.

FIG. 2 is a plan view of the plurality of video surveillance cameras 110a, 110b, 110c arranged to view a scene. A representative object 200 is illustrated that is within the field of view of all of the cameras 110a, 110b, 110c.

For example, the cameras may be set up to monitor a scene of interest such as a gaming table in a casino, or a security scanning area in an airport, or a valuable object in a shop or museum. Each camera views the scene from a different angle.

Figure 3:
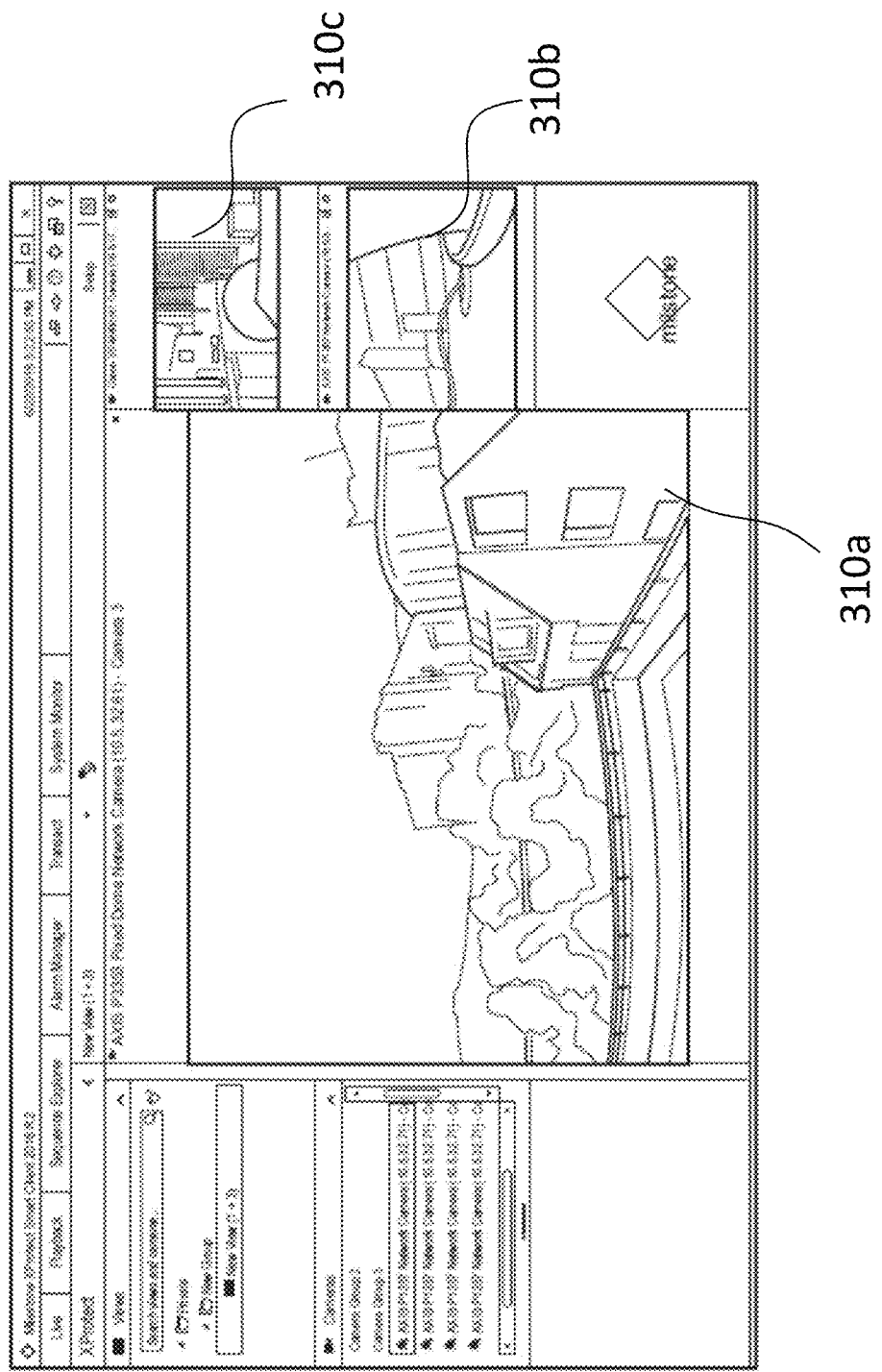
FIG. 3 is a view of an operator display.

The operator client 120 may be arranged to show the video image being captured by only one of the cameras 110a, 110b, 110c as a selected video image on its display. In this case, only one video data stream is sent to the operator client 120, this being the stream from the selected camera. FIG. 3 shows an example of a display in which the video being captured by one of the video cameras as a selected image is displayed in a main window 310a, with video images captured by other cameras being displayed in smaller windows 310b, 310c. In this case, multiple streams are sent to the operator client 120. In the case of a system with a large number of cameras, even a display such as that of FIG. 3 may not be able to show the video from all of the cameras, only a selection.

The present invention is particularly applicable to the situation where an operator is viewing the display of the operator client 120 to monitor a scene in real time (rather than viewing stored video data). In certain circumstances it may be crucial that the operator maintains a clear view of the scene continuously. It may happen that something changes in the scene to obscure the operator's view from the currently selected camera. For example, in the case of monitoring a card table in a casino, a person may walk in front of a particular player. Or a camera may malfunction or be deliberately obscured. In this instance, the operator may wish to switch the selected camera to an alternative camera which includes the same scene in its field of view quickly, so that they can continuously view the scene.

Accordingly, the present invention provides a prestored data set of alternative camera data which, for each camera, lists at least one other camera with an overlapping field of view.

In one embodiment, the alternative camera data is stored on the management server 130, and the alternative camera data is sent to the operator client 120 as part of the configuration data which is sent to the operator client 120 as part of the initialisation/set up procedure described above. For example, for each camera, the configuration data may include an "alternative camera" field identifying the alternative camera corresponding to each camera.

By providing the alternative camera data as part of the configuration data, this means that each operator client 120 does not need to communicate with the management server 130 every time alternative camera information is required, because each operator client 120 stores the alternative camera data in their cache. However, each time the operator client runs the set up procedure, new alternative camera data is downloaded from the management server 130. Thus, the alternative camera data can be amended or updated at the management server 130 and this will be communicated to each operator client 120 next time each operator client 120 runs the set up procedure.

When the operator wishes to switch to a different view of the scene from a different camera, a command is entered. This may be by means of a button or switch or a selectable icon on an interface displayed on the display of the operator client 120.

In another embodiment, the command to switch to an alternative camera view is automatically generated in response to a message received by the operator client 120 indicating a malfunction of the camera. In this case, for example, a recording server may detect that a camera is no longer streaming data or has a connection error and the recording server sends a message to all the operator clients connected to the system. If the operator client has currently selected to view video data from the defective camera, it can then generate the command to switch to the alternative view. It is also possible that some video analytics software may generate an alert indicating that a camera has been tampered with, for example if it is transmitting abnormal data because it has been obscured (e.g. by putting an object over the camera or other means such as spray paint). This alert can be broadcast to operator clients on the system and, in response to such an alert, if the operator client is currently viewing data from that camera, the operator client can trigger the command to switch to an alternative camera view.

Whether the command to switch to an alternative camera view is generated by a user or automatically, when the command is received by the operator client 120, the alternative camera data stored in the cache of the operator client 120 is consulted to determine an alternative camera with an overlapping field of view with the camera from which video data is currently being viewed. When an alternative camera has been determined, the operator client 120 sends a request to the recording server 150 for the data from the alternative camera. The request is received by the recording server 150 which then starts streaming the data from the alternative camera to the operator client 120 and the operator client 120 displays the video feed from the alternative camera.

In the case of a display such as that shown in FIG. 3 which displays video data from multiple cameras, the operator client 120 is already receiving video data streams from multiple cameras. Accordingly, when the command is received by the operator client 120, the alternative camera data stored locally in the cache of the operator client 120 is consulted to determine an alternative camera with a field of view which overlaps with the field of view of the camera from which video data is currently being viewed in the main window 310a. When an alternative camera has been determined, the operator client 120 determines whether data from the alternative camera is currently being displayed in one of the smaller windows 310b, 310c. If it is, then the operator client 120 displays the video data from the alternative camera in the main window 3110a. If it is not ie the operator client is not already receiving data from the alternative camera, then the operator client 120 sends a request to the recording server 150 for the data from the alternative camera. The request is received by the recording server which then sends the data from the alternative camera to the operator client 120 and the operator client displays the video feed from the alternative camera in the main window 310a.

In the above example, the alternative camera data set is stored at the management server 130 and uploaded to the operator client 120 during the set up procedure. This has the benefit of increasing the operating speed and reducing network traffic. However, the alternative camera data may be stored on the management server 130 or the recording server 150 and consulted by the operator client 120 when required. This has the benefit that changes to the alternative camera data are more quickly implemented.

The alternative camera data may include information identifying only one alternative camera corresponding to each camera. The designation of alternative cameras would be set in advance by an administrator, for example by amending the data set stored at the management server 130. In this case, the alternative camera for each camera may be selected by the administrator as the camera which has the maximum overlapping field of view. However, other factors may affect the selection of alternative camera, such as resolution, or angle of view. The administrator is free to set the alternative camera to be whichever they believe will give the best alternative view of a scene. Or the administrator might choose the alternative camera to be one which is less easily tampered with.

In another embodiment, the alternative camera data may designate a plurality of alternative cameras corresponding to each camera. The plurality of alternative cameras may have a predetermined order. In this case, when the operator enters the command to switch to an alternative camera, then the alternative camera data is consulted and the selected camera is switched to be a next camera in the predetermined order. In this case, the alternative cameras in the list are all selected to have overlapping fields of view. For example, they might view the same scene from different viewpoints.

In this embodiment, when an operator needs to switch to an alternative camera, the operator can initially enter the command to switch to an alternative camera, and the video feed from the alternative camera is shown as a full screen view. Then repeatedly entering the command will cycle through the list of alternative cameras, showing the feed from each one in turn, as a full screen view. Therefore, if the operator's view is obscured, they can quickly view a number of different camera views of the same scene, to find an unobscured view. This may be very important if the operator notes suspicious behaviour of an individual.

The predetermined order may be chosen and set in advance by the administrator to include multiple cameras with overlapping fields of view, and the order may be set by the administrator in order of which cameras have the best view of a particular scene. Various factors may determine which the administrator considers to be a better view, such as the degree of overlap of the field of view, the resolution of the camera, the angle of view or the distance from a particular object of interest.

If the operator has an interface which allows multiple camera feeds to be viewed simultaneously in different windows (as shown in FIG. 3) or on different screens, and the alternative camera data includes data relating to multiple alternative cameras, then entering the command may cause each of the windows or screens to show a view from a different one of the multiple alternative cameras. Thus, the operator can quickly view a plurality of alternative camera data feeds simultaneously.

In a display such as that shown in FIG. 3, the operator can then select the best view to be shown in the main window. Alternatively, the video feeds might appear in equally sized windows, and then the operator can select one to switch to a full screen view. Alternatively, the operator might have multiple screens, and each video feed might appear on a different screen, in a full screen view.

It may be that the operator can view all of the alternative camera data feeds simultaneously. For example, if the alternative camera data identifies N alternative cameras, then when the operator enters the command, N windows are displayed, each showing the video feed from one of the alternative cameras. The operator can then select which alternative camera feed to view.

Even if the operator is currently only viewing a single feed, in one embodiment, entering the alternative camera command might switch the operator's display to a multiple window display showing a plurality of alternative camera feeds, wherein the operator can then select one, and the display returns to displaying only the selected video feed. Therefore, in this embodiment, when the operator notices suspicious behaviour or their view is obscured, they can enter one command to immediately view all of the video feeds of cameras with views of the same scene, and quickly select the best view.

Thus, the various embodiments of the present invention allow an operator to quickly react to their view being obscured, particularly if they notice suspicious behaviour, and quickly find an alternative camera view and continue monitoring the suspicious behaviour.

Figure 4:
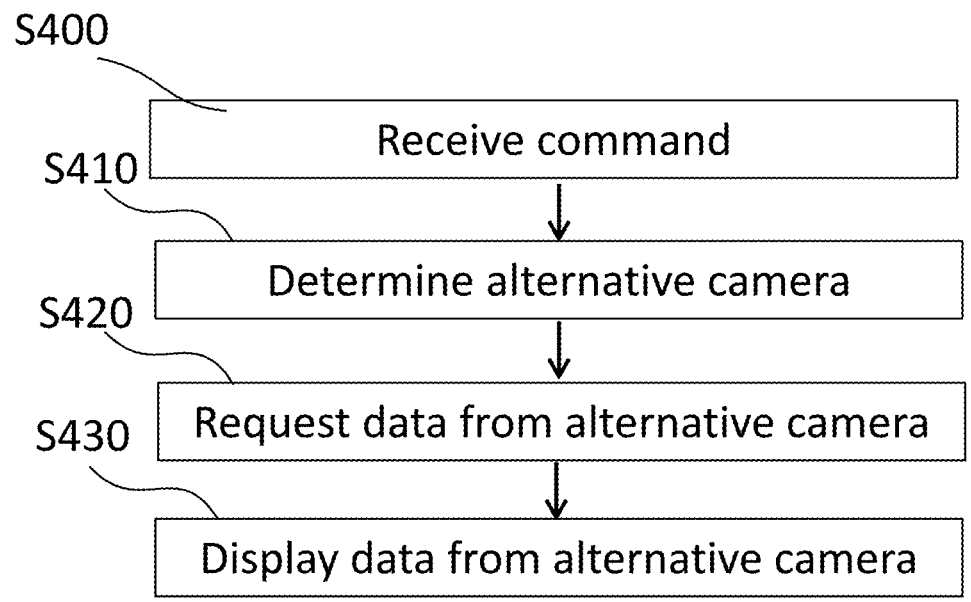
FIG. 4 is a flowchart illustrating a video surveillance method.

FIG. 4 is a flowchart representing a video surveillance method. In this example, an operator client 120 is displaying only a single video image on a display and the operator client 120 is currently receiving only a single stream of video data from one video camera. The operator client 120 includes an interface which allows an operator to select which camera video data is viewed from by communicating with the recording server 150.

At step 400, an operator client 120 receives a command to switch to an alternative camera view. This command can be generated by a user or automatically on receipt of a notification that the camera currently being viewed has malfunctioned or has been tampered with, as described above.

At step 410, the operator client 120 consults the alternative camera data stored in the cache of the operator client 120 to determine an alternative camera. The alternative camera data may be a one-to-one correspondence with only one alternative camera for each camera. Alternatively, the database may include a plurality of alternative cameras in a predetermined order. If the alternative camera data designates a plurality of alternative cameras in a predetermined order then the determined alternative camera is the next camera in the predetermined order after the current camera.

At step 420, the operator client 120 instructs the recording server 150 to stop sending the video data stream from the current camera to the operator client 120 and commence sending the video data stream from the determined alternative camera to the operator client 120.

At step 430, the video data stream from the alternative camera is received by the operator client 120 and displayed on the display.

According to the above disclosed embodiment, it is possible for an operator in a video surveillance system to quickly switch from displaying video data from one camera, to displaying video data from an alternative camera which is viewing the same scene. Thus, the operator can maintain visibility of the scene substantially continuously. Because the alternative camera data is prestored, it is not necessary for the operator to have knowledge of which cameras view the same scene in order to make a manual selection.

The invention claimed is:

1. A video surveillance method comprising:
displaying a stream of video data from a given video camera on a display of an operator client;
receiving a command;
on receipt of the command, selecting another video camera based on prestored alternative camera data corresponding to the given video camera; and
displaying a stream of video data from the another video camera on the display;
wherein the prestored alternative camera data corresponding to the given video camera comprises information identifying a plurality of alternative video cameras, the given video camera and the plurality of alternative video cameras having overlapping fields of view,
wherein the prestored alternative camera data is stored in a cache of the operator client, and
wherein the plurality of alternative video cameras having overlapping fields of view has a predetermined order of switching a stream of video data to be displayed on the display, and, every time the command is received, a stream of video data to be displayed on the display is switched in accordance with the predetermined order among a plurality of streams of video data from the plurality of alternative video cameras.

2. The method according to claim 1, wherein a plurality of streams of video data from the alternative video cameras identified in the alternative camera data are displayed simultaneously on the display.

3. The method according to claim 2, wherein, on receipt of a selection by an operator, a selected one of the plurality of streams is displayed as a selected image on the display.

4. The method according to claim 3, wherein, on receipt of the selection by the operator, only the selected image is displayed on the display.

5. The method according to claim 3, wherein a plurality of streams of video data from a plurality of cameras is received by the operator client and a plurality of images is displayed on the display in a plurality of windows, and wherein, on receipt of the selection by the operator, the selected image is displayed in a larger sized window.

6. The method according to claim 1, wherein only one stream of video data is received by the operator client at any time.

7. The method according to claim 6, further comprising a step of requesting the data from the other video camera.

8. The method according to claim 1, wherein a plurality of streams of video data from a plurality of cameras is received by the operator client and a plurality of images is displayed on the display in a plurality of windows, and wherein a selected image is displayed in a larger sized window.

9. The method according to claim 8, further comprising a step of determining if video data from the other camera is already being received by the operator client and, if it is, then displaying the stream of video data from the other video camera as the selected image on the display and, if it is not, then requesting the data from the other video camera.

10. The method according to claim 1, wherein the alternative camera data is stored in a management server and sent to the operator client during an initialisation procedure of the operator client.

11. The method according to claim 1, wherein the command is generated on receipt of a notification that the first video camera has malfunctioned or has been tampered with.

12. A method of operating a video management system comprising:
receiving a plurality of streams of video data from a plurality of video cameras;
selecting one of the plurality of streams of video data from a given video camera of the video cameras for display on a display of an operator client;
receiving a command; and
on receipt of the command, selecting another one of the plurality of streams of video data from another one of the video cameras based on prestored alternative camera data corresponding to the given video camera;
wherein the prestored alternative camera data corresponding to the given video camera comprises information identifying a plurality of alternative video cameras, the given video camera and the plurality of alternative video camera having overlapping fields of view,
wherein the prestored alternative camera data is stored in a cache of the operator client, and
wherein the plurality of alternative video cameras having overlapping fields of view has a predetermined order of switching a stream of video data to be displayed on the display, and, every time the command is received, a stream of video data to be displayed on the display is switched in accordance with the predetermined order among a plurality of streams of video data from the plurality of alternative video cameras.

13. A non-transitory computer readable medium having a computer program stored therein in a readable manner, the computer program causing a computer to execute a method:
displaying a stream of video data from a given video camera on a display of an operator client;
receiving a command;
on receipt of the command, selecting another video camera based on prestored alternative camera data corresponding to the given video camera; and
displaying a stream of video data from the another video camera on the display;
wherein the prestored alternative camera data corresponding to the given video camera comprises information identifying a plurality of alternative video cameras, the given video camera and the plurality of alternative video cameras having overlapping fields of view,
wherein, the prestored alternative camera data is stored in a cache of the operator client, and
wherein the plurality of alternative video cameras having overlapping fields of view has a predetermined order of switching a stream of video data to be displayed on the display, and, every time the command is received, a stream of video data to be displayed on the display is switched in accordance with the predetermined order among a plurality of streams of video data from the plurality of alternative video cameras.

14. A video surveillance device comprising:
a display;
a processor configured to:
receive a stream of video data from a given video camera and display the stream of video data from the given video camera on the display;
on receipt of a command, select another video camera based on prestored alternative camera data corresponding to the given video camera; and
display a stream of video data from the another video camera on the display;
wherein the prestored alternative camera data corresponding to the given video camera comprises information identifying a plurality of alternative video cameras, the given video camera and the plurality of alternative video cameras having overlapping fields of view,
wherein the prestored alternative camera data is stored in a cache of the video surveillance device, and
wherein the plurality of alternative video cameras having overlapping fields of view has a predetermined order of switching a stream of video data to be displayed on the display, and, every time the command is received, a stream of video data to be displayed on the display is switched in accordance with the predetermined order among a plurality of streams of video data from the plurality of alternative video cameras.

15. A video management system comprising:
a recording server configured to receive a plurality of video data streams from a plurality of video cameras;
an operator client configured to receive, from the recording server, a video data stream from a given video camera and display the video data stream from the given video camera on a display;
wherein the operator client is configured to, on receipt of a command, select another video camera based on prestored alternative camera data corresponding to the given video camera, and to display a stream of video data from the another video camera on the display,
wherein the prestored alternative camera data corresponding to the given video camera comprises information identifying a plurality of alternative video cameras, the given video camera and the plurality of alternative video cameras having overlapping fields of view,
wherein the prestored alternative camera data is stored in a cache of the operator client, and
wherein the plurality of alternative video cameras having overlapping fields of view has a predetermined order of switching a stream of video data to be displayed on the display, and, every time the command is received, a stream of video data to be displayed on the display is switched in accordance with the predetermined order among a plurality of streams of video data from the plurality of alternative video cameras.

16. The system according to claim 15, further comprising:
a management server having the alternative camera data stored therein;
wherein the management server is configured to send the alternative camera data to the operator client during an initialisation procedure.

17. The system according to claim 16,
wherein the operator client is configured to receive the alternative camera data from the management server and store the alternative camera data in a cache.

18. The video surveillance method according to claim 1, wherein every time the command which is generated in response to a user instruction is received, a stream of video data for display as full screen view on the display is switched in accordance with the predetermined order among the plurality of streams of video data from the plurality of alternative video cameras.

19. The method according to claim 1, wherein every time the command generated by user instruction is received, the stream of video data to be displayed on the display is switched one by one in accordance with the predetermined order set in advance among the plurality of streams of video data from the plurality of alternative video cameras.

* * * * *